(12) United States Patent
Hegler et al.

(10) Patent No.: US 12,270,497 B2
(45) Date of Patent: Apr. 8, 2025

(54) FLEXIBLE PIPE JOINT

(71) Applicant: FlexSteel Pipeline Technologies, LLC, Houston, TX (US)

(72) Inventors: Matthew Allen Hegler, Kingwood, TX (US); Andrew James Heaton, Lincolnshire (GB)

(73) Assignee: FlexSteel Pipeline Technologies, LLC, Houston, TX (US)

( * ) Notice: Subject to any disclaimer, the term of this patent is extended or adjusted under 35 U.S.C. 154(b) by 0 days.

(21) Appl. No.: 18/144,315

(22) Filed: May 8, 2023

(65) Prior Publication Data

US 2023/0304613 A1 Sep. 28, 2023

Related U.S. Application Data

(60) Continuation of application No. 16/908,226, filed on Jun. 22, 2020, now Pat. No. 11,644,136, which is a continuation of application No. 15/478,398, filed on Apr. 4, 2017, now Pat. No. 10,690,276, which is a division of application No. 12/995,130, filed as application No. PCT/GB2009/050272 on Mar. 24, 2009, now Pat. No. 9,625,070.

(60) Provisional application No. 61/060,049, filed on Jun. 9, 2008.

(51) Int. Cl.
| | |
|---|---|
| *F16L 33/207* | (2006.01) |
| *F16L 21/03* | (2006.01) |
| *F16L 33/01* | (2006.01) |
| *F16L 55/07* | (2006.01) |

(52) U.S. Cl.
CPC .......... *F16L 33/2071* (2013.01); *F16L 21/03* (2013.01); *F16L 33/01* (2013.01); *F16L 55/07* (2013.01)

(58) Field of Classification Search
CPC ......... F16L 21/03; F16L 33/20; F16L 33/207; F16L 33/2071; F16L 33/2073; F16L 33/2076; F16L 33/2078
See application file for complete search history.

(56) References Cited

U.S. PATENT DOCUMENTS

| | | | |
|---|---|---|---|
| 3,574,355 A | 4/1971 | Oetiker | |
| 3,702,707 A | 11/1972 | Rosan, Sr. | |
| 3,724,882 A | 4/1973 | Dehar | |
| 4,854,613 A | 8/1989 | Reece et al. | |
| 4,863,197 A * | 9/1989 | Munoz | F16L 33/2076 285/256 |
| 5,072,072 A | 12/1991 | Bawa et al. | |
| 5,215,336 A | 6/1993 | Worthing | |
| 5,224,738 A * | 7/1993 | Taga | F16L 47/02 285/21.2 |
| 5,259,651 A | 11/1993 | Sharp | |
| 5,330,235 A | 7/1994 | Wagner et al. | |
| 5,361,806 A * | 11/1994 | Lalikos | F16L 33/2076 138/109 |
| 5,378,023 A | 1/1995 | Olbrich et al. | |

(Continued)

*Primary Examiner* — David Bochna
(74) *Attorney, Agent, or Firm* — Greenberg Traurig, LLP; Dwayne L. Mason; Mark G. Chretien (57) ABSTRACT

A method and apparatus for securing a flexible pipe to a further flexible pipe in an end-to-end configuration, wherein the apparatus includes and the method utilizes an elongate tubular element having a first and second end and an outer surface comprising a raised central region. At least one vent passage extends at least partially across the raised central region.

19 Claims, 9 Drawing Sheets

(56) References Cited

U.S. PATENT DOCUMENTS

| | | | |
|---|---|---|---|
| 5,449,203 A * | 9/1995 | Sharp | F16L 39/005 |
| | | | 285/123.14 |
| 5,456,502 A | 10/1995 | Sharp | |
| 5,547,231 A | 8/1996 | Sharp | |
| 6,139,617 A | 10/2000 | Halko et al. | |
| 6,394,504 B1 | 5/2002 | Brummans et al. | |
| 6,523,862 B1 * | 2/2003 | MacDuff | F16L 33/2076 |
| | | | 285/256 |
| 6,575,500 B1 | 6/2003 | Will | |
| 6,737,584 B2 | 5/2004 | Kiely | |
| 7,007,983 B2 | 3/2006 | Arosio | |
| 8,074,687 B2 | 12/2011 | Queau et al. | |
| 9,470,347 B1 | 10/2016 | Peirce | |
| 9,625,070 B2 | 4/2017 | Hegler et al. | |
| 10,190,722 B2 | 1/2019 | Espinasse et al. | |
| 10,197,198 B2 | 2/2019 | Glejbol | |
| 10,226,823 B2 | 3/2019 | Karpachevskyy | |
| 10,226,892 B2 | 3/2019 | Kremers | |
| 10,234,068 B2 | 3/2019 | Varagnolo et al. | |
| 10,281,065 B2 | 5/2019 | Secher et al. | |
| 10,285,223 B2 | 5/2019 | Hatton et al. | |
| 10,288,207 B2 | 5/2019 | Littlestar et al. | |
| 10,378,682 B2 | 8/2019 | Cloos et al. | |
| 10,408,795 B2 | 9/2019 | Nicolas et al. | |
| 10,415,731 B2 | 9/2019 | Boche et al. | |
| 10,429,267 B2 | 10/2019 | Grimsley | |
| 10,436,667 B2 | 10/2019 | Littlestar et al. | |
| 10,442,925 B2 | 10/2019 | Rong et al. | |
| 10,451,206 B2 | 10/2019 | Espinasse et al. | |
| 10,471,661 B2 | 11/2019 | Boczkowski et al. | |
| 10,480,054 B2 | 11/2019 | Valdez et al. | |
| 10,487,965 B2 | 11/2019 | Bouey et al. | |
| 10,494,519 B2 | 12/2019 | Wilson et al. | |
| 10,513,896 B2 | 12/2019 | Gudme et al. | |
| 10,527,198 B2 | 1/2020 | Nicolson et al. | |
| 10,544,889 B2 | 1/2020 | Bouey et al. | |
| 10,544,892 B2 | 1/2020 | Holst et al. | |
| 10,605,391 B2 | 3/2020 | Hegler et al. | |
| 10,690,276 B2 * | 6/2020 | Hegler | F16L 33/2071 |
| 10,883,638 B2 * | 1/2021 | Hegler | F16L 33/2071 |
| 11,193,615 B1 | 12/2021 | Francis | |
| 2007/0296209 A1 | 12/2007 | Conley et al. | |
| 2009/0145506 A1 | 6/2009 | Queau et al. | |
| 2011/0109079 A1 | 5/2011 | Hegler et al. | |
| 2017/0205007 A1 | 4/2017 | Hegler et al. | |
| 2017/0205006 A1 | 7/2017 | Hegler et al. | |
| 2019/0003921 A1 | 1/2019 | Nicolas | |
| 2019/0024830 A1 | 1/2019 | Glejbol | |
| 2019/0094101 A1 | 3/2019 | Spiegel et al. | |
| 2019/0101233 A1 | 4/2019 | Hatton et al. | |
| 2019/0154186 A1 | 5/2019 | Varagnolo et al. | |
| 2019/0162334 A1 | 5/2019 | Westhoff et al. | |
| 2019/0162335 A1 | 5/2019 | Yu et al. | |
| 2019/0162336 A1 | 5/2019 | Andersen et al. | |
| 2019/0186656 A1 | 6/2019 | Kozak et al. | |
| 2019/0194440 A1 | 6/2019 | Rong et al. | |
| 2019/0126567 A1 | 7/2019 | Bornemann et al. | |
| 2019/0217337 A1 | 7/2019 | Gujare et al. | |
| 2019/0219473 A1 | 7/2019 | Littlestar et al. | |
| 2019/0242501 A1 | 8/2019 | Bereczkne et al. | |
| 2019/0257448 A1 | 8/2019 | Chalmers et al. | |
| 2019/0285199 A1 | 9/2019 | Nicolson et al. | |
| 2019/0309582 A1 | 10/2019 | Procida | |
| 2019/0331273 A1 | 10/2019 | Vos et al. | |
| 2019/0338868 A1 | 11/2019 | Hjorth | |
| 2019/0368967 A1 | 12/2019 | Grimsley | |
| 2019/0391097 A1 | 12/2019 | Nicolas et al. | |
| 2020/0011467 A1 | 1/2020 | Holst et al. | |

* cited by examiner

FLEXIBLE PIPE JOINT

CROSS-REFERENCE

The present disclosure claims priority to and benefit of U.S. application Ser. No. 16/908,226, entitled "FLEXIBLE PIPE JOINT," filed Jun. 22, 2020, and issued as U.S. Pat. No. 11,644,136, which claims priority to and benefit of U.S. application Ser. No. 15/478,398, entitled "FLEXIBLE PIPE JOINT," filed Apr. 4, 2017, and issued as U.S. Pat. No. 10,690,276, which claims priority to and benefit of U.S. patent application Ser. No. 12/995,130, entitled "FLEXIBLE PIPE JOINT," filed Jan. 20, 2011, and issued as U.S. Pat. No. 9,625,070, which claims priority to and benefit of International Patent Application No. PCT/GB2009/050272, entitled "FLEXIBLE PIPE JOINT" and filed Mar. 24, 2009, which claims priority to and benefit of U.S. Provisional Application No. 61/060,049, entitled "FLEXIBLE PIPE JOINT" and filed Jun. 9, 2008, which are each incorporated herein in its entirety for all purposes.

BACKGROUND

The present invention relates to a method and apparatus for securing one flexible pipe to another flexible pipe in an end-to-end configuration. In particular, but not exclusively, the present invention relates to a method of joining lengths of flexible pipe together to form a pipeline whereby gases trapped in an annulus region of a flexible pipe in one part of the pipeline can be transmitted into a corresponding annulus region in another part or parts of the pipeline.

Un-bonded flexible pipe is well-known and there are many uses for which such flexible pipe may be utilised. For example, transmitting fluid such as a production fluid like oil or gas from one location to another. Such flexible pipe may be used for offshore purposes as well as onshore or over land purposes. Typically such flexible pipe includes an inner fluid retaining layer, often referred to as a liner or barrier layer, which helps prevent fluid flow radially outwards from the bore. This layer has an inner diameter defining a bore along which fluid can flow. One or more armour layers are typically formed around the fluid retaining layer. The armour layer or layers are typically, but not exclusively, formed by winding steel strip about the fluid retaining layer. The armour layer or layers provide pressure reinforcement to prevent burst through of the inner fluid retention layer as well as preventing collapse of the flexible pipe due to external pressures. Additionally the armour layer can provide tensile strength to resist longitudinal forces of either extension or contraction on the flexible pipe. The flexible pipe also typically includes an outer sheath which is arranged to prevent ingress of fluid and/or contaminants from an environment where the flexible pipe is located.

The region between the outer sheath and inner fluid retaining layer defines an annulus region extending along the length of the portion of flexible pipe in which the armour layer or layers are located. One well known problem associated with this annular layer is that gas which penetrates through the fluid retaining layer from the transported fluid collects in the annular region. Also where the flexible pipe is utilised in an environment including undesirable gas such gas can permeate through the outer sheath and likewise be trapped in the annulus region. The trapped gases can collect and on occasion can cause rupturing in the flexible pipe or can degrade performance of the flexible pipe over time in many known ways. For this reason gases trapped in the annulus of un-bonded flexible pipe require venting. This has been achieved in the past by securing adjacent portions of flexible pipe together in a way such that a gas pathway is formed between corresponding annulus regions in adjacent flexible pipes. One or more valves have then been used to vent the gases trapped at one or more predetermined locations. In the past the pathway between connected pipes has been provided by jumper tubes. The configuration of the jumper tubes used has in the past been determined by the mechanism by which portions of flexible pipe have been secured to one another in an end-to-end configuration. For example, when end fittings have been used jumper tubes have required vent holes to be machined in each end fitting so that the jumper tube can transmit gases from one pipe end past the end fittings to the other pipe end.

Over the entire length of a pipeline formed by two or more portions of flexible pipe connected together in an end-to-end configuration the gases that accumulate in the annulus space can thus be directed to one or both ends of the pipeline or to other locations where an exit valve is located.

Unfortunately such jumper tubes are often fragile and tend to create obstructions when performing rehabilitation work. Broken jumper tubes or missing plugs in an end fitting can cause harmful gases to escape in an uncontrolled fashion or allow moisture into the flexible pipe annulus which potentially damages the flexible pipe and degrades performance.

SUMMARY

It is an aim of the present invention to at least partly mitigate the above-mentioned problems.

It is an aim of embodiments of the present invention to provide a method for securing an end of a first portion of flexible pipe to an end of a further portion of flexible pipe in an end-to-end configuration whereby gases trapped in an annulus region of each portion of flexible pipe are in fluid communication and can thus be vented at an end or other desired locations of the pipeline formed by the co-connected the portions of flexible pipe.

It is an aim of embodiments of the present invention to provide a flexible pipe connector which can be used to connect one portion of flexible pipe to a further portion of flexible pipe.

It is an embodiment of the present invention to provide a method and apparatus which enables gases trapped in the annulus regions of un-bonded flexible pipe to be transmitted to one or more end regions or mid sections where such gases can be vented.

According to a first aspect of the present invention there is provided apparatus for securing a flexible pipe to a further flexible pipe in an end-to-end configuration, comprising:
  an elongate tubular element comprising a first and second end and an outer surface comprising a raised central region; and
  at least one vent passage extending at least partially across the raised central region.

According to a second aspect of the present invention there is provided A method of securing a flexible pipe to a further flexible pipe in an end-to-end configuration, comprising the steps of:
  urging an end of a first flexible pipe into an annulus region between a first end of an elongate tubular element and a first jacket member;
  urging an end of a second flexible pipe into a further annulus region between a second end of the elongate tubular element and a second jacket member; and providing a vent path from an annular region of the first flexible pipe to a corresponding annular region of the second flexible pipe via a vent passage extending at least partially across a raised central region of the elongate tubular element.

Embodiments of the present invention provide a method by which external jumper tubes can be eliminated from a pipeline. Where adjacent flexible pipes are joined together venting paths are incorporated within a connector piece so that gases can be transmitted through the midline connection.

Embodiments of the present invention provide a vent path which is internal so as to eliminate extra tubes and any external obstructions.

Embodiments of the present invention will now be described hereinafter, by way of example only, with reference to the accompanying drawings in which:

BRIEF DESCRIPTION OF DRAWINGS

In the drawings like reference numerals refer to like parts.

DETAILED DESCRIPTION

Figure 1:
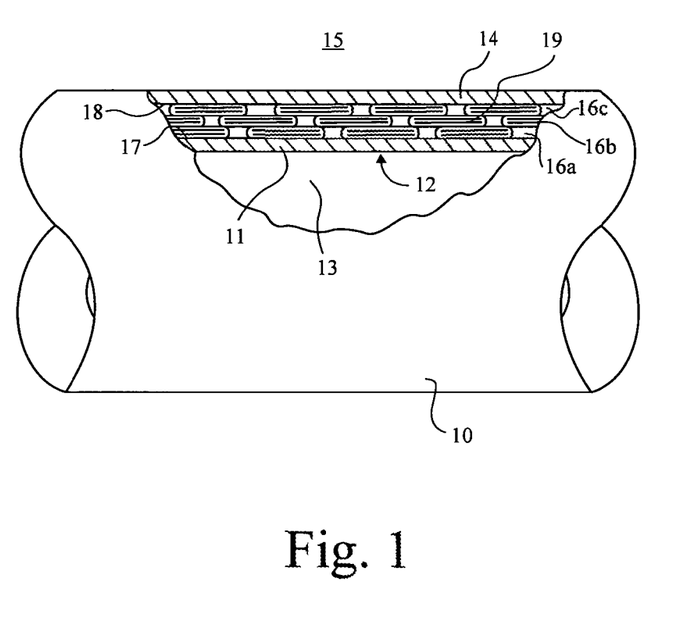
FIG. 1 illustrates a flexible pipe.

FIG. 1 illustrates a cross sectional view of a portion of flexible pipe 10. It will be understood that the longitudinal length of the flexible pipe can be from a few metres to a few kilometres or more in length. An innermost fluid retaining layer 11 has an inner surface 12 which defines a central bore 13 along which fluid can flow. The flexible pipe is applicable to the transportation of a wide variety of fluids such as water or production fluids such as oil or gas. One or more inner layers (not shown) may be provided under the fluid retaining layer An outer sheath 14 provides an outer protection layer which prevents ingress of contaminants as well as providing physical protection against attack from an environment 15 outside the flexible pipe.

Three layers 16a, 16b, 16c of armour protection are formed between an outer surface 17 of the fluid retaining layer and an inner surface 18 of the outer sheath 14. An annular region 19 is thus formed between the inner surface 18 of the outer sheath and outer surface 17 of the fluid retaining layer 11.

It will be understood that the armour layers 16a-16c may be provided by one or more layers of wound strips according to further embodiments of the present invention. Also whilst the strips illustrated in FIG. 1 are shown as having a substantially flat cross section, it will be understood that strip having predetermined cross sections may be used according to further embodiments of the present invention. Such strips may or may not interlock to some extent.

Figure 2:
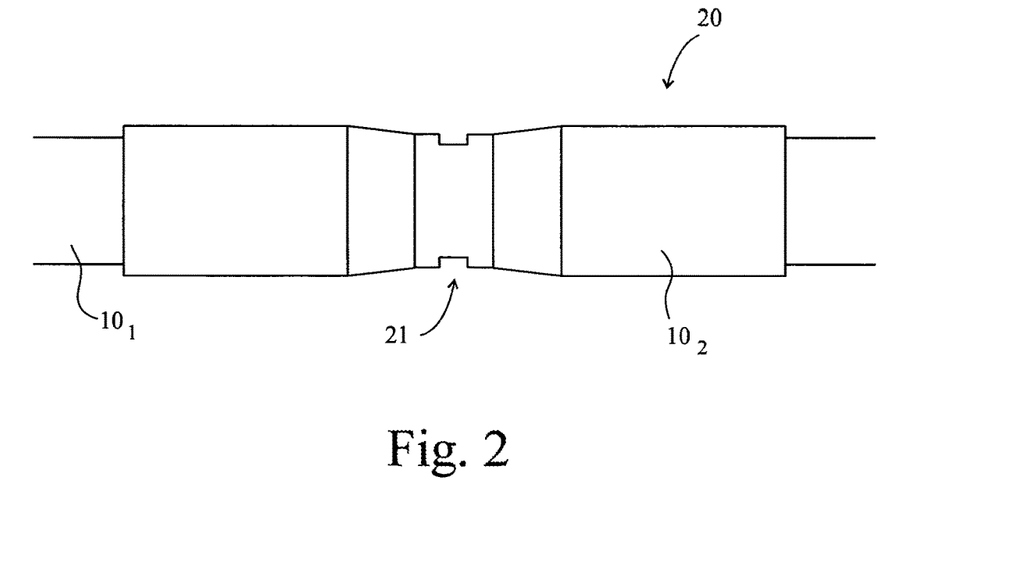
FIG. 2 illustrates a pipeline.

FIG. 2 illustrates how a pipeline 20 can be formed by joining portions of pipeline $10_1$, $10_2$ together in an end-to-end configuration via a mid-line connector 21. It will be understood that a pipeline may be formed by two or more portions of flexible pipe $10_{1, 2}$ . . . each joined to one or two adjacent portions of flexible pipe by a respective connection.

Figure 3:
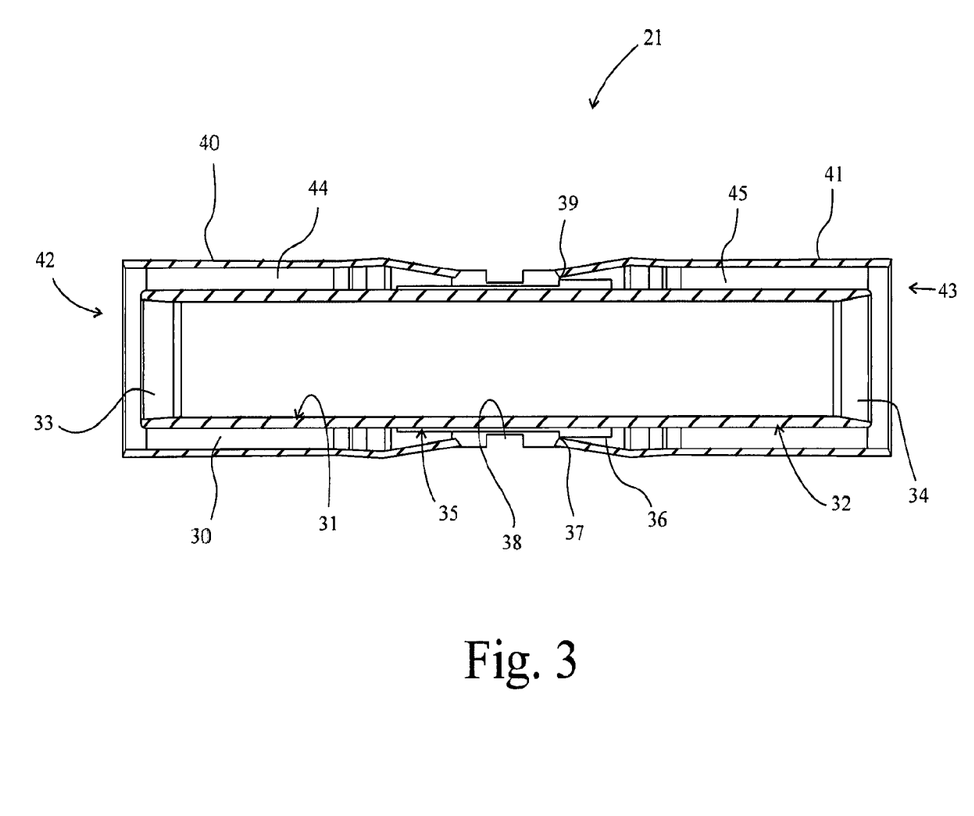
FIG. 3 illustrates a midline connector.

FIG. 3 illustrates a connector 21 useable to secure adjacent portions of flexible pipe together in more detail. The connector includes an inner cylindrical tube 30 having a substantially cylindrical inner surface 31 and an outer surface 32 which is inwardly tapered at a first open end 33 and a further open end 34. The taper helps locate the pipe ends with respect to the connector during connection.

A central region of the outer surface of the tube is stepped outwardly to form a raised central section 35. The raised portion 35 is itself stepped radially outwardly at one end 36 to form an abutment surface 37.

Prior to securing to a flexible pipe a ring 38 is slipped over the first end 33 of the tube 30. The ring has an inner diameter provided by an inner cylindrical surface having a dimension just big enough to slip over the outer diameter of the narrow end of the outer surface of the raised portion 35 of the tube. An end 39 of the ring abuts with the surface 37 of the wide end of the raised portion 35. This duly locates the ring in position.

The ring 38 has a central cut out region to aid handling. Other profiles of ring may be utilised as discussed herein below.

Subsequent to the fitting of the ring 38 about the raised central section of the cylindrical tube a first jacket 40 and further jacket 41 are secured to the connecting ring via weldment, adhesive, bolt or screw or other such fastening mechanism. Each jacket has respective open mouth 42, 43 and is generally cylindrical in shape with an inwardly tapered end which tapers radially inwardly at one end of the jacket. Subsequent to the jackets being secured to the ring an annulus region is defined at each end of the midline connector. The annular region 44 at a first end of the connector is defined between an outer surface of the cylindrical tube and an inner surface of a respective jacket 40. A further annulus region 45 is defined between an outer surface of a further end of the tube and an inner surface of a remaining jacket 41. It will be understood that the jackets may be secured to other locations of the connector 21.

Figure 4:
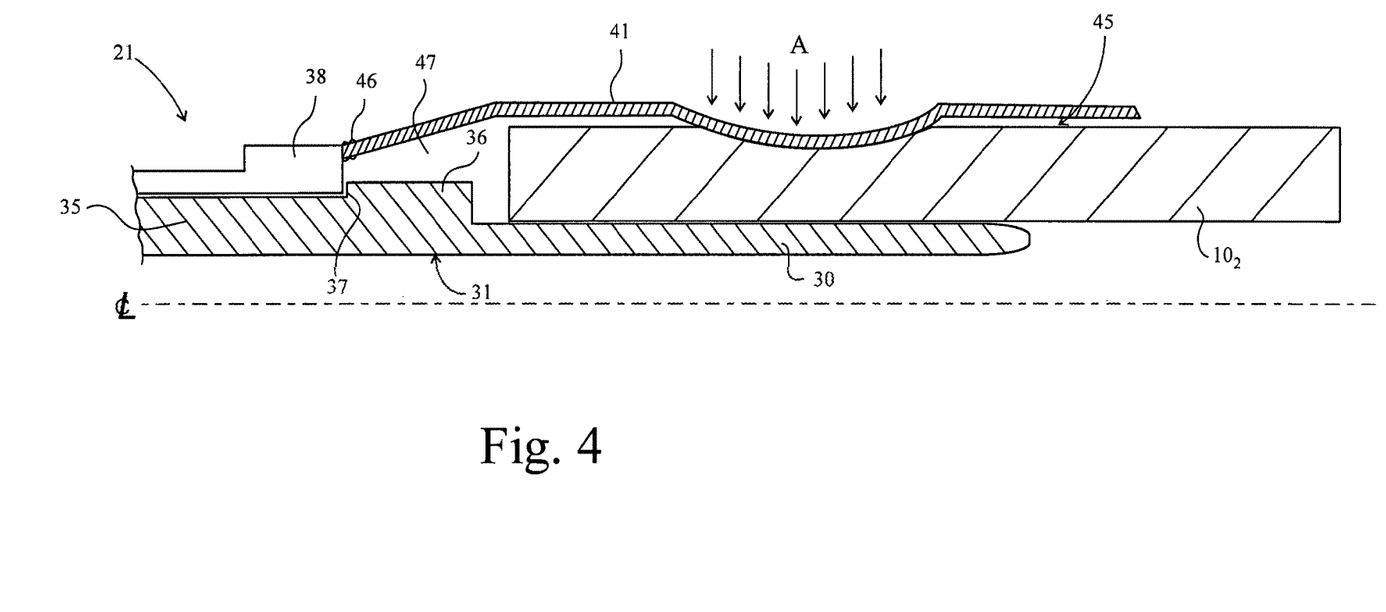
FIG. 4 illustrates a flexible pipe connected to a connector.

FIG. 4 illustrates how an end of a flexible pipe $10_2$ may be secured at one end of the midline connector 21 between a jacket 41 secured to the ring 38 mounted on the midline connector 21. Subsequent to securing the jacket 41 to the connector ring via the weldment 46 or other such fastening, an end of the flexible pipe $10_2$ is introduced into the annulus region 45. Subsequently during a swaging process the jacket 41 is deformed by a force exerted as shown by arrow A in FIG. 4 which locks the pipe end in the connector. It will be appreciated that other fastening techniques, such as bolting, gluing, welding or the like, may be utilised to secure the end of the flexible pipe to the jacket 41 and tube 30.

Figure 5:
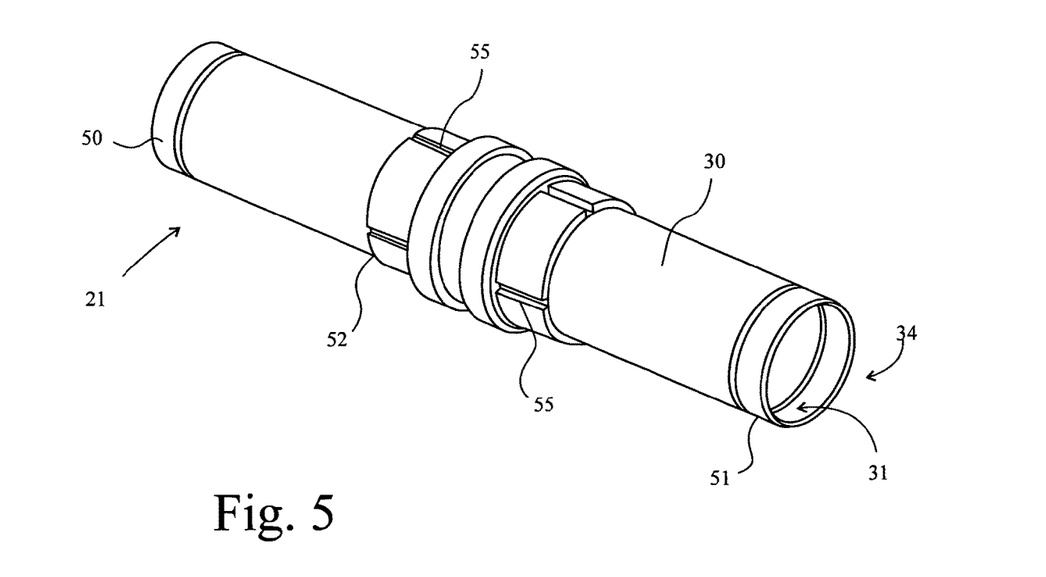
FIG. 5 illustrates part of a midline connector.

As illustrated in FIG. 4 an open end of the flexible pipe is thus in fluid communication with a space 47 which is a part of the annular region between the jacket an cylindrical body 30. As such the annular region formed between the outer surface 17 of the fluid retaining layer and inner surface 18 of the outer sheath will vent directly into this space 47. From there fluid flow occurs via passageways formed as bores or slots through the cylindrical body 30 and/or ring 38 to a corresponding space at the other end of the midline connector. From there fluid venting from one flexible pipe can pass into the corresponding annular region of the adjacent flexible pipe portion FIG. 5 illustrates a further view of a midline connector 21 before jackets are attached. The connector has a cylindrical body 30 having a substantially cylindrical inner surface 31 which defines an internal bore along which fluid can flow through the connector and along the pipeline in general. The outer surface 32 of the connector is tapered inwardly towards a first open end to thereby define an inwardly extending region 50 extending circumferentially around the body. At a further open end 34 a further circumferentially extending tapered region 51 is formed. A central region of the outer surface of the cylindrical body is stepped radially outwardly at a first end 52 to provide a raised outer surface which is generally cylindrical. This extends to a further end region 36 of the central raised section 35 of the connector. As illustrated in FIG. 5 an end 52 of the raised section thus extends radially outwardly less than the other end 36 of the raised section. A ring 38 is slid over the central raised region from the first end 52 and along the raised section until the ring abuts with the radially outwardly extending step at the further end of the raised region. This duly locates the ring in position.

As illustrated in FIG. 5 slots 55 are formed in the raised central section of the connector. One or more slots can be preformed and as illustrated in FIG. 5 the slots extend across the whole width of the central raised section. It will be appreciated that the slots may be formed less than the whole way through the raised portion according to further embodiments of the present invention. The ring 38 covers a central region of each of the slots when duly located.

Figure 6:
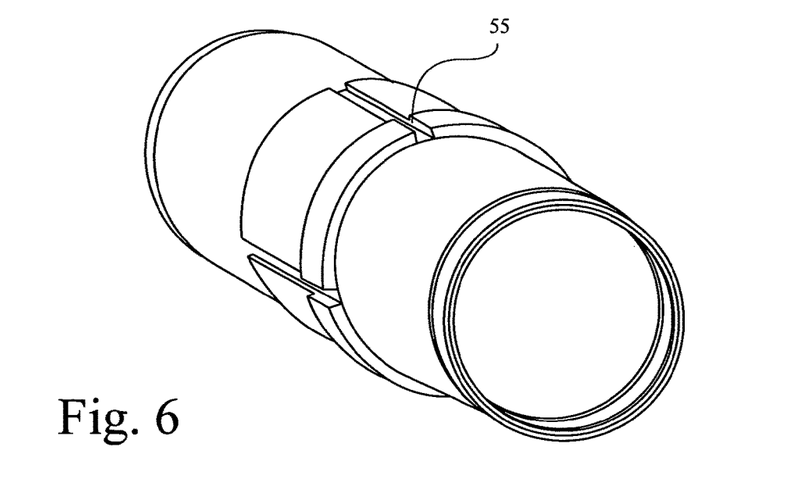
FIGS. 6, 6A and 6B illustrates alternate embodiments of a part of the connector.
Figure 6A:
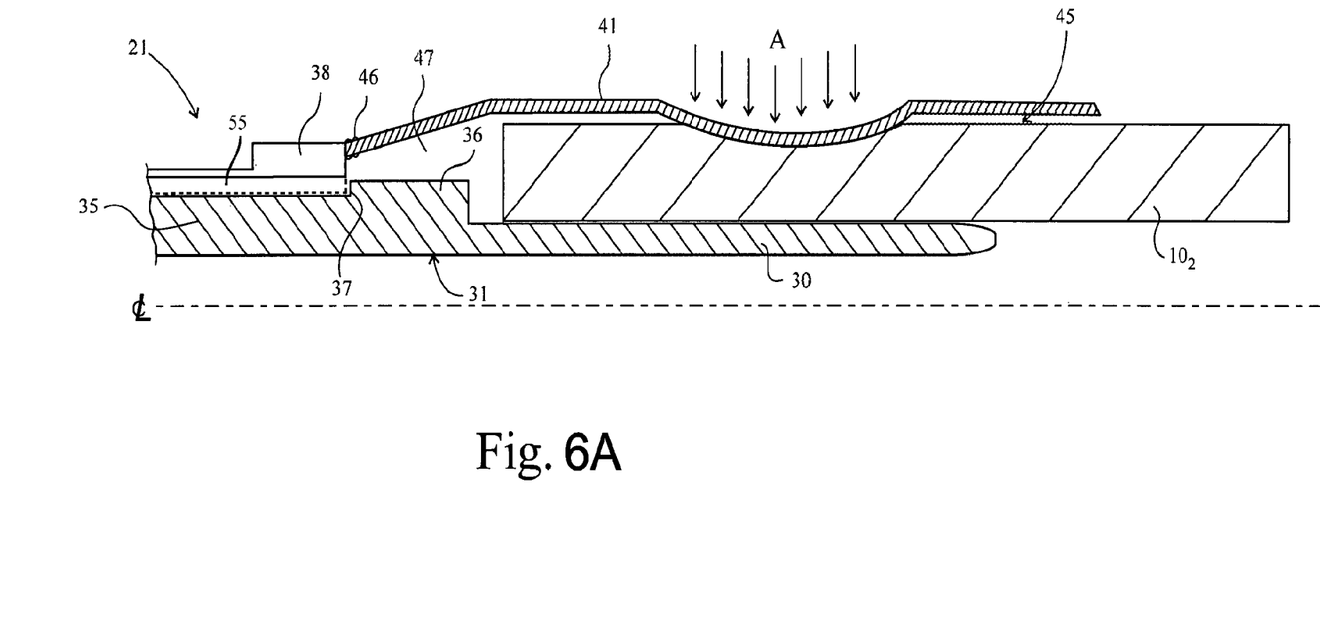
Figure 6B:
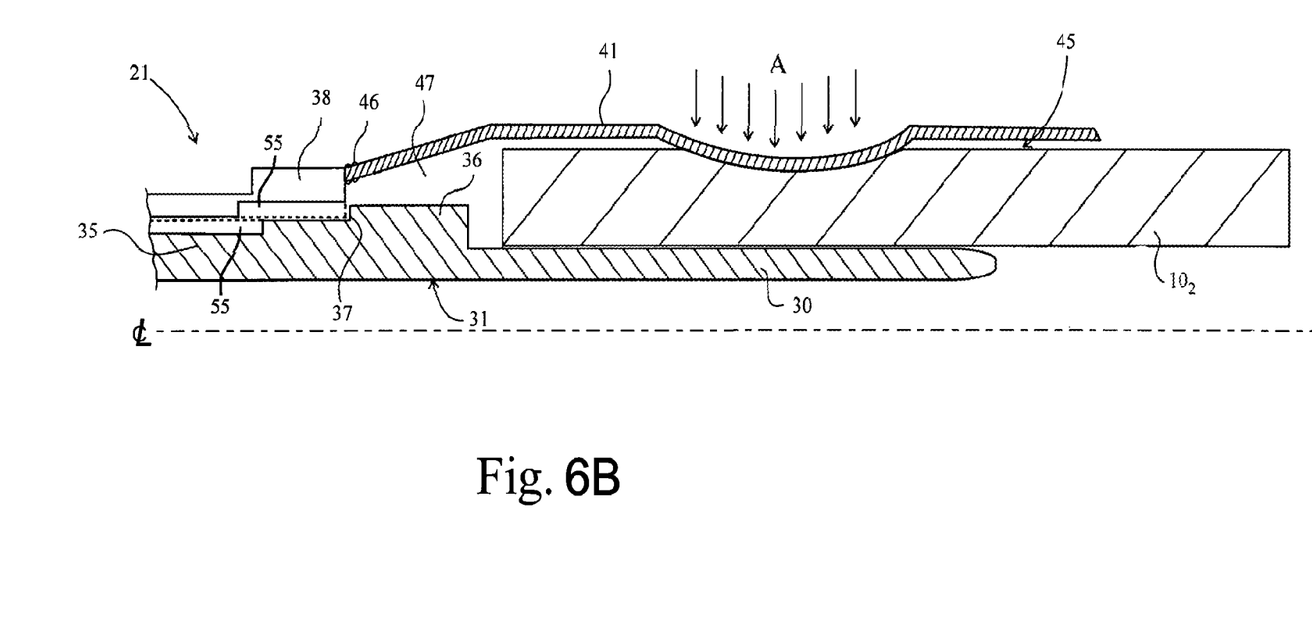

FIG. 6 illustrates the raised central portion of the connector and the slots 55 prior to the ring being put in position. FIG. 6 also illustrates how an outer surface of the raised central section is stepped. It will be appreciated that in use the slots 55 provide a vent passage along which fluid such as gas or liquid can flow when the pipeline is in operation. To this end the vent passage can, instead of a slots, be formed as a through bore or partial through bore through the raised central section of the connector. Still further alternative embodiments include one or more slots or bores formed at one or more predetermined locations on the ring which communicate with partial mating passages formed by slots or bores in the raised central region of the connector, as illustrated in FIG. 6B. It will be appreciated that the raised central region of the connector may be integrally formed with the cylindrical body as illustrated in FIGS. 5 and 6 or alternatively may be a separate unitary or multi-piece unit secured to the cylindrical body prior to application of the ring.

Figure 7:
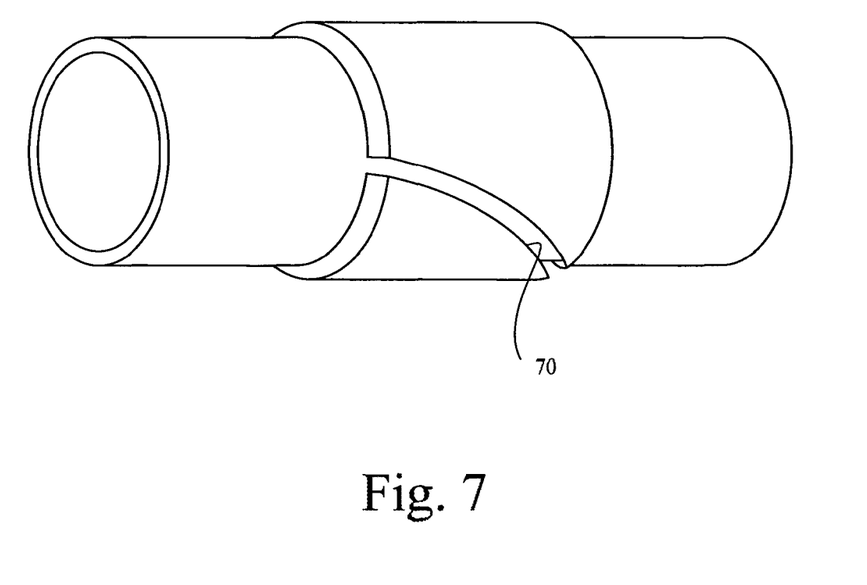
FIG. 7 illustrates an alternative midline connector.

FIG. 7 illustrates an alternative embodiment of the connector shown in FIG. 6 and illustrates how the slots 55 may be alternatively formed as curved or labyrinthine passageway through the raised section. Although the curved slot 70 illustrated in FIG. 7 is shown passing the whole way through the raised section in the middle of the connector alternative embodiments of the present invention can make use of one or more curved slots which pass only a partial way through the raised portion.

Embodiments of the present invention eliminate flanged or welded end fittings for the purpose of connecting two sections of flexible pipe together. The connector is installed as a coupling that reduces leak potential caused by two flanged end fittings which would otherwise be used according to the prior art. The midline connector also eliminates the need for welding two separate end fittings together as per the prior art.

The connector "grabs" two ends of flexible pipe from the inner and outer diameters. The tubular body contacts an inner diameter of each flexible pipe and a centering ring is used to hold the connector during a swaging operation. External jackets are welded to the centering ring and these can be used to grab the outer diameter of the flexible pipe.

Venting is incorporated between the inner body and centering ring by means of slots or other types of passage. The slots can be cut axially along a section of the body outer diameter or alternatively can be helically formed. Slots may be on the raised portion of the cylindrical body and/or an inner surface of the ring, as shown in FIGS. 5, 6, 6A, 6B and 7.

The body and centering ring are concentrically mated together and form vent paths completely enclosed within the midline connector.

Slots machined on the outer diameter of the body may alternatively take the form of a helix or labyrinthine structure wrapping around the raised surface of the body outer diameter. This is advantageous during a manufacturing process as lathes may be used to machine the body without independent milling capabilities.

Alternative embodiments of the present invention utilise a design which includes mating the body and centering ring by loose fitting threads which allow gases to pass through the helical gaps in the threads.

Figure 8:
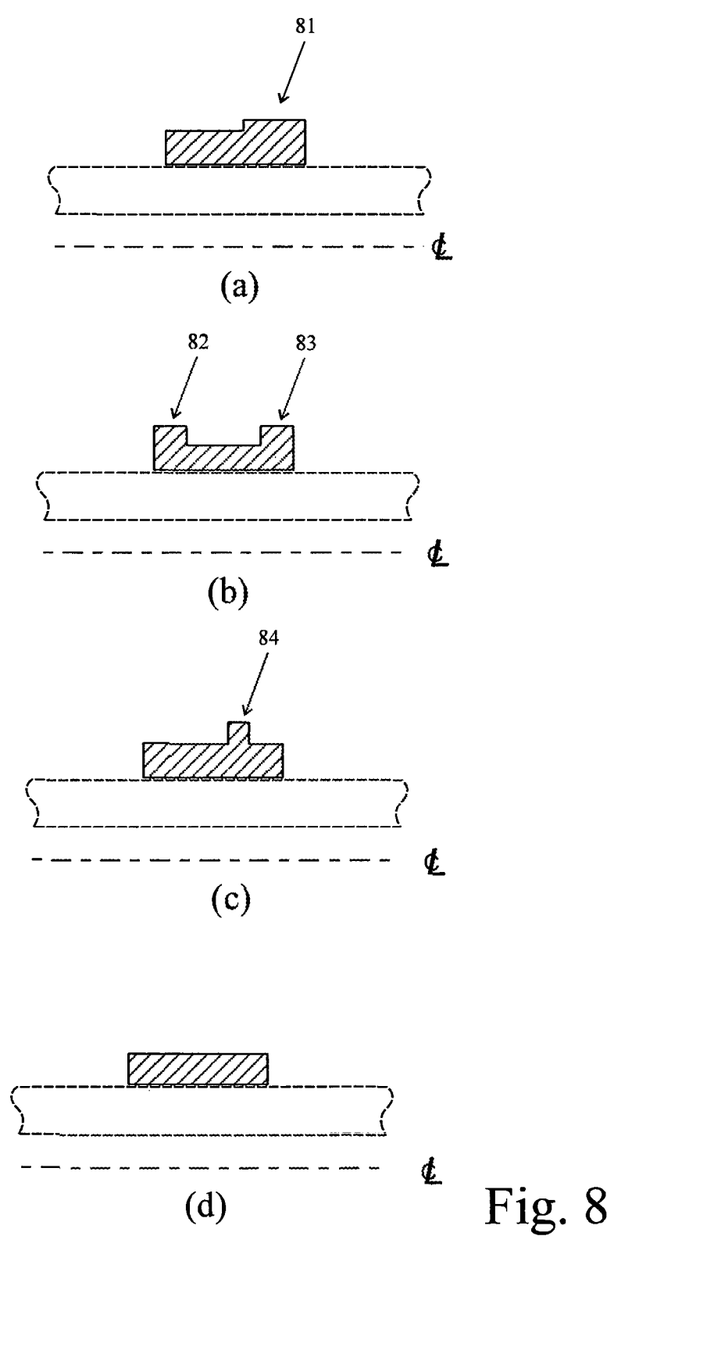
FIG. 8 illustrates alternative ring shapes.

FIG. 8 illustrates alternative cross sectional views of a centering ring 38. FIG. 8b illustrates the cross section of ring illustrated in the previous drawings. FIG. 8a illustrates substantially cylindrical ring with a radially outwardly stepped raised portion 81 at predetermined end. As shown in FIG. 8b the outer surface of the ring may alternatively have raised portion 82, 83 at each longitudinal end. FIG. 8c illustrates a raised portion 84 which extends radially outwardly from a substantially cylindrical body within the ends of the ring but offset from a central point. FIG. 8d illustrates how a substantially cylindrical ring may be utilised. It will be appreciated that further cross sections of ring may be utilised according to still further embodiments of the present invention.

Prior art connections for securing flexible pipe together have transmitted gases between two separate sections of flexible pipe by incorporating external components connected to end fittings. These external components, such as jumper tubes, were connected to jackets or other portions of a connector by either welding or threading components. The present invention eliminates all external components and the process of connecting external components to end fittings. The internal nature of the venting provided by embodiments of the present invention provides a more direct path for the gas transmittal, thus reducing the possibility of an obstructed path. Pressure build-up within annulus spaces caused by blocked gas can cause rupture of the outer shield layer of the flexible pipe and this is avoided according to embodiments of the present invention.

The midline connection is thus a multi-part system that "grabs" two ends of flexible pipe from the inner and outer diameters. The midline connection includes an inner body formed as a tube that contacts an inner diameter of the pipe. A centering ring is used to hold the midline connection during a swaging operation and external jackets are welded to the centering ring. These external jackets are used to grab an outer diameter of each flexible pipe.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

What is claimed is:

1. A pipeline system comprising a pipe connector, wherein the pipe connector comprises:
   a connector body that defines a connector bore and has a raised central portion;
   a first jacket secured to a first end of the raised central portion of the connector body such that the first jacket extends axially around a first side portion of the connector body to define a first connector annular region between a first inner surface of the first jacket and a first outer surface of the connector body, wherein the first jacket is configured to be swaged to plastically deform the first jacket radially inward such that the first jacket conforms to a first pipe disposed within the first connector annular region to facilitate securing the pipe connector to the first pipe;
   a second jacket secured to a second end of the raised central portion of the connector body such that the second jacket extends axially around a second side portion of the connector body to define a second connector annular region between a second inner surface of the second jacket and a second outer surface of the connector body, wherein the second jacket is configured to be swaged to plastically deform the second jacket radially inward such that the second jacket conforms to a second pipe disposed within the second annular connector region to facilitate securing the second pipe to the first pipe directly using the pipe connector, and
   a vent passage formed in the connector body such that the vent passage fluidly connects the first connector annular region and the second connector annular region in the pipe connector to facilitate fluidly connecting a first pipe annular region in the first pipe and a second pipe annular region in the second pipe.

2. The pipeline system of claim 1, wherein the connector body of the pipe connector comprises:
   an inner tube that defines the connector bore; and
   a ring secured around a central region of the inner tube to form the raised central portion of the connector body.

3. The pipeline system of claim 2, wherein the vent passage of the pipe connector comprises a first slot formed in the inner tube of the connector body, a second slot formed in the ring of the connector body, or both.

4. The pipeline system of claim 1, wherein:
   the first pipe comprises:
      a first fluid retaining layer that defines a first pipe bore;
      a first outer sheath layer formed around the first fluid retaining layer; and
      a first armour layer formed between the first fluid retaining layer and the first outer sheath layer in the first pipe annular region of the first pipe; and
   the second pipe comprises:
      a second fluid retaining layer that defines a second pipe bore;
      a second outer sheath layer formed around the second fluid retaining layer; and
      a second armour layer formed between the second fluid retaining layer and the second outer sheath layer in the second pipe annular region of the second pipe.

5. The pipeline system of claim 4, wherein:
   the first armour layer comprises a first one or more helically wound strips; and
   the second armour layer comprises a second one or more helically would strips.

6. The pipeline system of claim 1, wherein:
   the first pipe comprises a first flexible pipe; and
   the second pipe comprises a second flexible pipe.

7. The pipeline system of claim 1, wherein:
   each open end of the connector body of the pipe connector is tapered;
   a first open end of the first jacket is tapered; and
   a second open end of the second jacket is tapered.

8. The pipeline system of claim 1, wherein the raised central portion of the connector body comprises a central cutout configured to aid in handling of the pipe connector.

9. The pipeline system of claim 1, wherein the vent passage in the pipe connector has a helical shape.

10. A method of manufacturing a pipe connector, comprising:
    forming a connector body of the pipe connector with a raised central portion to define a connector bore;
    securing a first jacket to a first end of the raised central portion of the connector body such that the first jacket extends axially around a first side portion of the connector body to define a first connector annular region between a first inner surface of the first jacket and a first outer surface of the connector body that enables the first jacket to be deformed radially inward such that the first jacket conforms to a first pipe disposed within the first connector annular region to facilitate securing the pipe connector to the first pipe; and
    securing a second jacket to a second end of the raised central portion of the connector body such that the second jacket extends axially around a second side portion of the connector body to define a second connector annular region between a second inner surface of the second jacket and a second outer surface of the connector body that enables the second jacket to be deformed radially inward such that the second jacket conforms to a second pipe disposed within the second annular connector region to facilitate securing the pipe connector to the second pipe;
    wherein forming the connector body comprises:
    forming a cutout in the raised central portion of the connector body to facilitate handling the pipe connector; and
    forming a vent passage in the connector body such that the vent passage fluidly connects the first connector annular region and the second connector annular region in the pipe connector to facilitate fluidly connecting a first pipe annular region in the first pipe and a second pipe annular region in the second pipe.

11. The method of claim 10, wherein forming the connector body comprises:
    forming an inner tube to define the connector bore; and
    securing a ring around a central region of the inner tube to form the raised central portion of the connector body.

12. The method of claim 11, wherein forming the vent passage in the connector body comprises:
    forming a first slot in the inner tube of the connector body;
    forming a second slot in the ring of the connector body;
    or
    both.

13. The method of claim 10, wherein forming the connector body comprises forming the connector body with tapered open ends.

14. The method of claim 10, wherein forming the vent passage in the connector body comprises forming the vent passage with a helical shape.

15. A pipeline system comprising a pipe connector, wherein the pipe connector comprises:
- an inner tube that defines a connector bore;
- a ring secured circumferentially around the inner tube;
- a jacket secured to end of the ring such that the jacket extends axially around the inner tube to define a connector annular region between an inner surface of the jacket and an outer surface of the inner tube, wherein the jacket is configured to be swaged to plastically deform the jacket radially inward such that the jacket conforms to a pipe disposed within the connector annular region to facilitate securing the pipe connector to the pipe;
- another jacket secured to an opposite end of the ring such that the another jacket extends around the inner tube to define another connector annular region between another inner surface of the another jacket and another outer surface of the inner tube, wherein the another jacket is configured to be swaged to plastically deform the another jacket radially inward such that the another jacket conforms to another pipe disposed within the another connector annular region to facilitate securing the pipe connector to the another pipe; and
- a vent passage formed through the inner tube, the ring, or both such that the vent passage is fluidly connected to the connector annular region in the pipe connector to facilitate venting fluid in a pipe annular region of the pipe.

16. The pipeline system of claim 15, wherein the pipe comprises:
- a fluid retaining layer that defines a pipe bore;
- an outer sheath layer formed around the fluid retaining layer; and
- an armour layer formed between the fluid retaining layer and the outer sheath layer in the pipe annular region of the pipe.

17. The pipeline system of claim 16, wherein the armour layer of the pipe comprises one or more helically wound strips.

18. The pipeline system of claim 15, wherein the vent passage in the pipe connector has a helical shape.

19. The pipeline system of claim 15, wherein the vent passage is formed through the inner tube, the ring, or both to fluidly connect the connector annular region in the pipe connector to the another connector annular region in the pipe connector.

\* \* \* \* \*